Nov. 23, 1954  J. MURPHY  2,694,822
SEWAGE PIPE CLEANER
Filed March 11, 1952
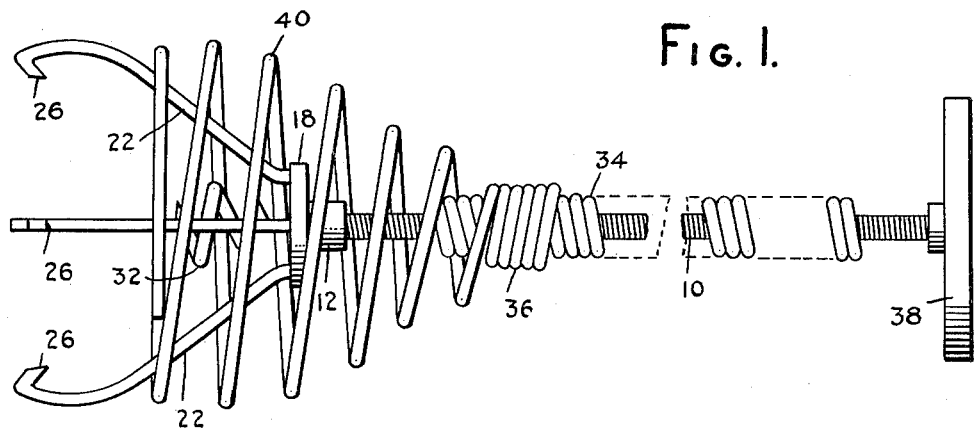
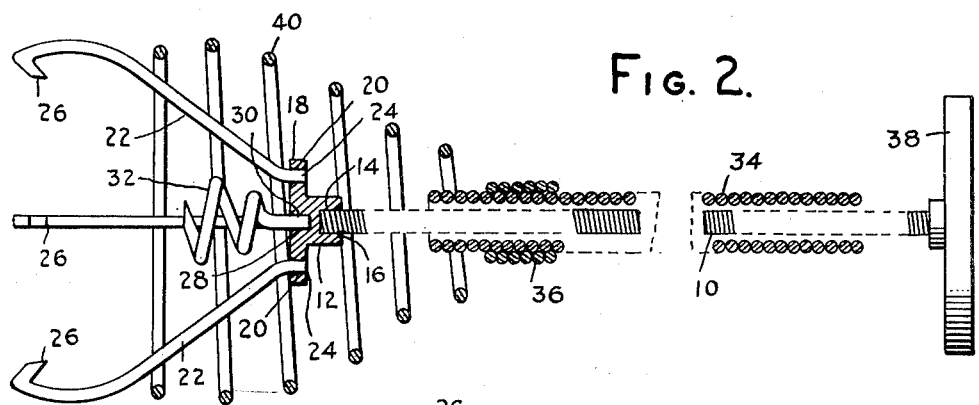
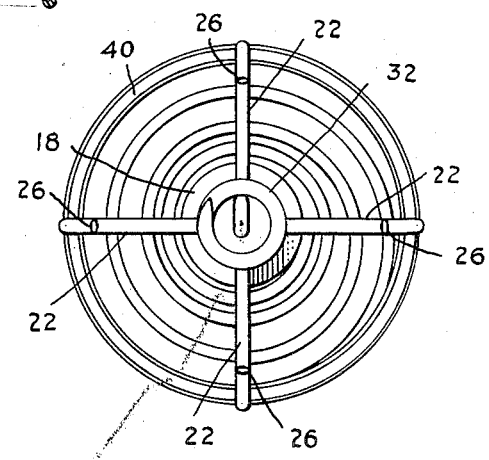
INVENTOR
JAMES MURPHY
BY
*McMorrow, Berman + Davidson*
ATTORNEY

United States Patent Office 2,694,822
Patented Nov. 23, 1954

2,694,822

SEWAGE PIPE CLEANER

James Murphy, Minneapolis, Minn.

Application March 11, 1952, Serial No. 275,897

2 Claims. (Cl. 15—104.3)

This invention relates to a device for cleaning pipes such as those incorporated in sewage systems, and more particularly, relates to a device especially adapted for removing objects or obstructions lodged within household drain pipes or the like.

Quite often, an object of substantial size will lodge within a drain pipe, at a location which makes removal of the object difficult. This is particularly true with respect to toilets, the drain or soil pipes of which tend to become clogged with wads of paper, objects thrown therein by small children, etc. When, for example, the object is lodged within the conventional trap, removal of the object is quite difficult.

Heretofore, devices for clearing pipes of obstructions of the type stated have been conceived and have been placed in use. However, these do not operate efficiently in all cases, in view of the fact that the devices now in general use are usually equipped with an auger-like projection which must engage within the object before said object can be removed. Quite often, the auger will not grip the object, due to the particular nature of the object or obstruction.

It is, accordingly, the main object of the present invention to provide a device of the type stated which will be so formed as to permit the object to be gripped in either or both of two ways, namely, by an auger member, and by a plurality of gripping tines adapted to be biased radially and inwardly of the pipe in which the obstruction is lodged, so as to engage the outer surface of the object at locations spaced circumferentially thereof. In this manner, it is proposed to assure the gripping of the object by the device in every instance.

Another important object is to provide a device as stated wherein the means for biasing the gripping tines into engagement with the lodged object will be simple in design and in operation.

Yet another important object is to provide, in a device as described, a particular arrangement of gripping tines and auger, wherein the threading of the auger into the object will position the tines about the object, at a location where biasing of the tines into engagement with the object will strengthen the hold of the auger thereupon.

Yet another important object is to provide, in a pipe cleaning device of the character referred to, a construction which will embody a minimum of parts, simply arranged in a manner whereby they will not readily get out of order.

Summarized briefly, the invention includes an elongated, flexible shaft having a handle at one end and having an auger projected as an axial extension of the other end of the shaft. On the other end of the shaft, a plurality of gripping tines of springable characteristics is mounted, said tines being so arranged relative to the auger as to be capable of being shifted into engagement with an object into which the auger is threaded or against which the auger abuts. On the shaft, I provide an elongated, flexible housing in which the shaft is both rotatable and longitudinally shiftable. A bell-like cage is mounted upon the housing, and is so arranged relative to the tines as to be adapted to cam the tines inwardly into gripping engagement with an object to be removed, responsive to relative longitudinal movement between the shaft and housing, thus to permt rotation of the shaft for engaging the object with the auger, and longitudinal movement of the shaft relative to the housing for shifting the tines into the outer surface of the object or obstruction.

Other objects will appear from the following description, the claims appended thereto, and from the annexed drawing, in which like reference characters designate like parts throughout the several views, and wherein:

Figure 1 is a side elevational view of a device formed in accordance with the present invention, portions being broken away;

Figure 2 is a longitudinal sectional view; and

Figure 3 is an end elevational view, the device being viewed from the left of Figure 1.

Referring to the drawings in detail, the reference numeral 10 has been applied to an elongated, flexible shaft or cable, said shaft being of any length desired. In the present instance, the shaft 10 is formed, from end to end thereof, with closed convolutions, this being one type of shafting which can be employed advantageously in the present invention. However, it is believed that other types of flexible shafting now in use can be employed to equal advantage within the scope of the claims appended hereto.

A head 12 is provided at one end of the shaft, said head having a cylindrical body at one end of which is formed an axial socket 14 receiving said end of the shaft, a weld 16 or equivalent means being utilized to secure the head fixedly to the shaft. On the other end of said cylindrical body of the head 12, an annular flange 18 is provided, said flange being integral with the body of the head 12 and being formed with a circumferential series of equidistantly spaced openings 20.

The invention includes a plurality of gripping tines 22, each tine being of spring steel formation and having one end 24 fixedly secured within an associated opening 20 of the flange 18.

As will be noted from Figures 1 and 2, the several tines 22 are extended obliquely and radially of the shaft 10, away from the flange 18, for sliding of the outer end portions of the tines along the inner surface of a drain pipe, not shown, in which an object is lodged.

The outer or free ends of the several tines 22 are formed with inturned hooks 26, said hooks being adapted to engage in the outer surface of the lodged object when the tines are biased inwardly and radially of the drain pipe into which the device constituting the present invention is extended.

Formed in the outer end of the head 12 is an axial recess 28, receiving one end 30 of an auger 32. The auger 32 is projected as an axial extension of the shaft 10, the tines 22 extending beyond and being disposed about the auger. Any suitable means is employed to fixedly secure the end 30 of the auger 32 within its associated recess 28.

As a part of the present invention, I provide an elongated, tubular housing 34 of flexible characteristics. The housing 34 is preferably formed of a plurality of closed spring convolutions, and has an inner diameter substantially greater than the outer diameter of the flexible shaft 10, to provide for relative longitudinal movement of the shaft and housing. Thus, the shaft 10 is not only adapted to be rotated within the housing 34, but is also adapted to be shifted longitudinally of the housing whenever desired.

As will be noted from Figure 2, both ends of the shaft 10 project from the opposite ends of the housing 34, one end of the housing being disposed contiguous to a handle 38 secured to one end of the shaft 10. The handle 38 is adapted to be grasped by a user, while the adjacent end of the housing 34 defines a hand grip which can be grasped by the other hand of the user, thus to provide for rotation of the shaft 10 relative to the housing, and also to provide for movement of the shaft longitudinally of the housing.

Contiguous to the other end of the housing 34, there is secured to said housing the base 36 of a cage 40, said cage being of generally conical formation and being formed preferably as a spiral, bell-shaped spring. At the smaller end of the cage 40, the convolutions of said spring are coiled tightly about the housing 34 to provide the base 36, thus to secure the cage fixedly to said housing.

The larger end of the cage projects beyond the end of the shaft 10 on which the head 12 is fixed, and is circumposed about the series of tines 22.

As a result, when the shaft 10 is shifted longitudinally of the housing 34, the larger, open end of the cage 40 will engage the several tines 22, intermediate the opposite ends of the tines, and will be effective for biasing the tines inwardly and radially, thus to force the hooks 26 into engagement with the object to be removed.

In use, the device is first extended into the drain pipe in which an object has been lodged, and the free end of the auger 32 is abutted against said object. Then, the shaft 10 is rotated relative to the housing 34, for the purpose of threading the auger into the object.

In some instances, the nature of the obstruction will be such as to prevent the auger from entering the object, and the user accordingly grasps the housing 34 and handle 38, and shifts the handle longitudinally of the housing, thus to cause the larger, open end of the cage 40 to engage the tines 22 and cam said tines inwardly into engagement with the object to be removed.

When the object has been effectively gripped by the tines, the user withdraws the entire device from the drain pipe, thus removing the obstruction lodged in said pipe.

Even in instances in which the auger is threadable into the obstruction, it may be desirable to shift the tines into engagement with the outer surface of the obstruction, thus to strengthen the hold of the auger upon said obstruction. When the tines are used in this manner, they will grip the exterior surface of the lodged object at a location spaced away from the location at which the object is engaged by the auger, this being particularly effective in assuring a tight grip upon the obstruction.

It is to be understood that the particular number of tines 22 is not of importance, and the device can be made with any number of pairs of tines, as desired. The showing of four tines in the drawing is merely illustrative of a presently preferred embodiment of the invention.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a device for removing an obstruction from a pipe, a flexible shaft, a flexible housing surrounding the shaft, the shaft and housing being rotatable and movable endwise relative to each other, a head on one end of said shaft, flexible tines extending longitudinally outwardly and radially outwardly from said head and spaced therearound, said tines having free ends having radially inwardly directed hooks, an auger fixed on said head and extending longitudinally outwardly from the head centrally of said tines, said auger being shorter than said tines and having a free end terminating at a point spaced longitudinally inwardly from the free ends of the tines, and a cage fixed on the adjacent end of said housing and surrounding the tines for compressing the tines toward each other as said shaft and said housing are moved longitudinally relative to each other.

2. In a device for removing an obstruction from a pipe, a flexible shaft, a flexible housing surrounding the shaft, the shaft and housing being rotatable and movable endwise relative to each other, a head on one end of said shaft, flexible tines extending longitudinally outwardly and radially outwardly from said head and spaced therearound, said tines having free ends having radially inwardly directed hooks, an auger fixed on said head and extending longitudinally outwardly from the head centrally of said tines, said auger being shorter than said tines and having a free end terminating at a point spaced longitudinally inwardly from the free ends of the tines, and a cage fixed on the adjacent end of said housing and surrounding the tines for compressing the tines toward each other as said shaft and said housing are moved longitudinally relative to each other, said cage comprising a tapered spring spiral having a smaller end fixed to said housing and a larger end surrounding said tines.

References Cited in the file of this patent

UNITED STATES PATENTS

| Number | Name | Date |
|---|---|---|
| 963,965 | Weber | July 12, 1910 |
| 1,787,112 | King | Dec. 30, 1930 |
| 1,796,197 | Galbraith | Mar. 10, 1931 |
| 2,244,735 | Silverman | June 10, 1941 |
| 2,246,056 | McKenzie | June 17, 1941 |

FOREIGN PATENTS

| Number | Country | Date |
|---|---|---|
| 579,266 | Great Britain | July 29, 1946 |